United States Patent
Hsu et al.

(10) Patent No.: US 7,506,162 B1
(45) Date of Patent: *Mar. 17, 2009

(54) METHODS FOR MORE FLEXIBLE SAML SESSION

(75) Inventors: Heng-Ming Hsu, Sunnyvale, CA (US);
Qingwen Cheng, Fremont, CA (US);
Ping Luo, Santa Clara, CA (US);
Bhavna Bhatnagar, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 792 days.

This patent is subject to a terminal disclaimer.

(21) Appl. No.: 10/833,414

(22) Filed: Apr. 27, 2004

Related U.S. Application Data

(63) Continuation-in-part of application No. 10/619,657, filed on Jul. 14, 2003, now Pat. No. 7,237,256.

(51) Int. Cl.
*H04L 9/00* (2006.01)
*H04L 9/32* (2006.01)
*G06F 7/04* (2006.01)

(52) U.S. Cl. .................. 713/168; 713/176; 713/177; 713/178; 726/3; 726/4; 726/5; 726/6; 726/7; 726/27; 726/28; 726/29; 726/30

(58) Field of Classification Search .............. 726/4; 713/168

See application file for complete search history.

(56) References Cited

U.S. PATENT DOCUMENTS 5,898,780 A    4/1999    Liu et al.

(Continued)

FOREIGN PATENT DOCUMENTS

EP    1370963 A1    3/2002

(Continued)

OTHER PUBLICATIONS

Lurie, Marty, "The Federation—Database Interoperability, the Adventure Continues (Part 2),"IBM, Jul. 17, 2003, located in the internet at http://www-128.ibm/developerworks/db2/library/techarticle/0307lurie/0307lurie.html, 19 pages.

(Continued)

*Primary Examiner*—Longbit Chai
(74) *Attorney, Agent, or Firm*—Hickman Palermo Truong & Becker LLP

(57) ABSTRACT

In accordance with one embodiment of the present invention, there is provided a mechanism for implementing navigation seamlessly between sites in a computing environment in order to access resources without having to require users or user agents to re-authenticate. In one embodiment, there is provided the ability to determine different attribute sets for use with different resources on a target site for a user or user agent authenticated with a first site seeking to access one or more resources of the second site without re-authenticating. In one embodiment, there is provided the ability to map accounts on a first site to accounts on the second site using a set of attributes selected from among attributes provided by an application on the first site. With this mechanism, it is possible for applications or other resources to share information about a user or a user agent across disparate web sites seamlessly.

9 Claims, 7 Drawing Sheets

U.S. PATENT DOCUMENTS

| | | | |
|---|---|---|---|
| 5,944,824 | A | 8/1999 | He |
| 6,161,139 | A | 12/2000 | Win et al. |
| 6,263,342 | B1 | 7/2001 | Chang et al. |
| 6,587,124 | B1 | 7/2003 | Slaby |
| 6,807,636 | B2 * | 10/2004 | Hartman et al. ............... 726/14 |
| 6,892,307 | B1 | 5/2005 | Wood et al. |
| 7,016,877 | B1 | 3/2006 | Steele et al. |
| 7,085,840 | B2 | 8/2006 | de Jong et al. |
| 2002/0029336 | A1 | 3/2002 | Sekiyama et al. |
| 2002/0143755 | A1 | 10/2002 | Wynblatt et al. |
| 2003/0149781 | A1 * | 8/2003 | Yared et al. ................ 709/229 |
| 2003/0172127 | A1 | 9/2003 | Northrup et al. |
| 2004/0001594 | A1 | 1/2004 | Krishnaswamy et al. |
| 2004/0003139 | A1 | 1/2004 | Cottrille et al. |
| 2004/0003251 | A1 | 1/2004 | Narin et al. |
| 2004/0003268 | A1 | 1/2004 | Bourne et al. |
| 2004/0003269 | A1 | 1/2004 | Waxman et al. |
| 2004/0003270 | A1 | 1/2004 | Bourne et al. |
| 2004/0015783 | A1 | 1/2004 | Lennon et al. |
| 2004/0059728 | A1 | 3/2004 | Miller et al. |
| 2004/0073661 | A1 | 4/2004 | Eibach et al. |
| 2004/0083243 | A1 | 4/2004 | Feng et al. |
| 2004/0117170 | A1 | 6/2004 | Walsh et al. |
| 2004/0117460 | A1 | 6/2004 | Walsh et al. |
| 2004/0186826 | A1 | 9/2004 | Choi et al. |
| 2004/0230571 | A1 | 11/2004 | Robertson |
| 2004/0260949 | A1 * | 12/2004 | Aoki et al. .................. 713/201 |

FOREIGN PATENT DOCUMENTS

| | | | |
|---|---|---|---|
| EP | 1091274 A2 | | 4/2002 |
| FR | EP 0 940 960 A1 * | | 3/1998 |
| GB | 2387991 A | | 3/2003 |
| WO | WO 00/60484 A1 | | 5/2000 |
| WO | WO 02/58336 A1 | | 7/2002 |

OTHER PUBLICATIONS

United Kingdom Patent Office, "Combined Search and Examination Report," in regards to Application No. GB0507718.5, report dated Jun. 23, 2005, 5 pages.

Current Claims, Application No. GB0507718.5, 8 pages.

Liberty Alliance Project, "Liberty ID-FF Architecture Overview," Version 1.2, 2003, pp. 1-44.

U.S. Appl. No. 10/837,146, filed Apr. 30, 2004.

United Kingdom Patent Office, "Examination Report under Section 18(3)" in regards to Application No. GB0507718.5, report dated May 16, 2006, 2 pages.

* cited by examiner

METHODS FOR MORE FLEXIBLE SAML SESSION

CLAIM OF PRIORITY

This application is a Continuation-In-Part of a U.S. Nonprovisional patent application Ser. No. 10/619,657, entitled, "Method and System for Providing an Open and Interoperable SAML Session," filed Jul. 14, 2003 now U.S. Pat. No. 7,237,256, the entire contents of which are incorporated by reference as if fully set forth herein.

BACKGROUND

In many computer implementations, it is desirable to be able to navigate between multiple sites in a computing environment in order to access resources without having to re-authenticate at each site. Conventional approaches to accessing resources spread across more than one web site typically do not share security information about the user between the sites. Accordingly, in conventional approaches the user must require the user to re-authenticate at the new site.

As shown in the above referenced parent application, it is possible to alleviate this multiple authentication problem. In one approach, single sign-on techniques are provided to enable a first site that has authenticated a user to share security information indicating that the user has been authenticated at the first site with a subsequent site accessed by the user. The sharing of this security information and enables the user to not have to be authenticated at the second site. Thus, single sign-on is achieved.

In the approach described in the above referenced parent application, when a first site sends an assertion to a second site indicating that the user has been authenticated, it includes in the assertion some subject information that allows the second site to map a specific account on the second site with a specific account on the first site, so that there is a one-to-one mapping between accounts on the first site and the second site. The first site also includes in the assertion some attributes pertaining to the subject (e.g., user). These attributes are used by the second site to process requests from the user. By providing this information, the first site enables the second site to properly process requests from the user.

SUMMARY

While the approach of the parent is advantageous, it can be enhanced to be even more effective. It is observed that currently user account attributes are determined on a site level, but some sites may have more than one resource on the site, each resource requiring a different attribute to process user requests accurately. The attribute should be determined based not just on the site, but on the resource being requested. It is also observed that in some situations, a one-to-one correspondence between accounts on the first site and on the second site is not advantageous. It may be desirable to map multiple accounts on the first site to a single account on the second site. For example, all managers could be mapped to a single manager account. In such implementations, it is desirable to map not just on the subject of the account, but also on the attribute of the account. For example, an attribute may be a role indicating the account belongs to that of the manager.

In accordance with one embodiment of the present invention, there is provided a mechanism for implementing navigation seamlessly between sites in a computing environment in order to access resources without having to require users or user agents to re-authenticate. In one embodiment, the mechanism provides the ability to determine different attribute sets for use with different resources on a target site for a user or user agent authenticated with a first site that is seeking to access one or more resources of the second site without re-authenticating. In one embodiment, the mechanism provides the ability to map a set of accounts on a first site to accounts on the second site using a set of attributes selected from among attributes provided by an application on the first site. With this mechanism, it is possible for applications or other resources to share information about a user or a user agent across disparate web sites seamlessly.

In one embodiment, a request to access a resource on a second site is received at a first site. The request may be from a user or a user's agent that has already authenticated with the first site, for example. A mapping between one or more user associated attributes on the first site and one or more input attributes needed by the resource on the second site is determined based at least partially upon the resource. An assertion is sent from the first site to the second site. The assertion comprises an identifier indicating the first site as a source of the assertion, an indication the user has been authorized and can access resources on the second site and a set of attributes selected in accordance with the mapping. The method can allow access to the second site and the resource on the second site without requiring the user to authenticate with the second site.

In one embodiment, the indication that the user has been authorized is provided using Security Assertion Markup Language (SAML), which is an extension of eXtended Markup Language (XML) for providing single sign-on functionality. In one embodiment, users may be provided the ability to authenticate in one domain and use the resources in another domain without re-authenticating.

In accordance with one embodiment of the present invention, there is provided a mechanism for implementing the ability to map a set of accounts on a first site to accounts on the second site using a set of attributes selected from among attributes provided by an application on the first site. With this mechanism, it is possible for users or user agents authenticated with a first site to be directed to one or more different accounts on a second site based upon any of a wide variety of attributes without re-authenticating at the second site.

In one embodiment, a request from a first site to access a resource on a second site is received at the second site. A user has already authenticated with the first site. The resource may be any application or service. An assertion is received from the first site responsive to a request by the second site. The assertion may include an identifier indicating the first site as a source of the assertion, an indication that the user is authorized to access the resource on the second site and a set of attributes associated with one or more accounts on the first site. A set of one or more selected attributes for mapping accounts on the first site to accounts on the second site are determined from the set of attributes based upon the assertion and a mapping. The attributes need not include an account identifier. One or more accounts on the first site are mapped to accounts on the second site using at least one of the selected attributes.

From the above discussion, it is clear that this embodiment of the present invention enables users or user agents to navigate seamlessly between sites in a computing environment in order to access resources on different sites without having to re-authenticate when site boundaries are crossed. More specifically, a user that has authenticated with a first site would like to obtain access to the resource on the second site without having to re-authenticate in order to save time and effort. For example, a user that has authenticated with a travel agent's site may desire to access his frequent flyer account on another site to update his frequent flyer program information when making travel arrangements at the first site. Further, it may be desirable to map information about accounts on the first site to accounts related to resources or applications on the second site using a set of one or more attributes about the account. For example, an administrator at the second site may desire to map accounts of persons located on the west coast to one account and accounts of persons located on the east coast to a different account. This ability to share information among applications or other resources seamlessly across disparate sites makes it possible to attain improved efficiency from computing resources that are used to provide services to users or user agents in a computer system.

DETAILED DESCRIPTION OF EMBODIMENT(S)

Conceptual Overview

While the approach of the parent is advantageous, it can be enhanced to be even more effective. It is observed that currently user account attributes are determined on a site level, but some sites may have more than one resource on the site, each resource requiring a different attribute to process user requests accurately. The attribute should be determined based not just on the site, but on the resource being requested. It is also observed that in some situations, a one-to-one correspondence between accounts on the first site and on the second site is not advantageous. It may be desirable to map multiple accounts on the first site to a single account on the second site. For example, all managers could be mapped to a single manager account. In such implementations, it is desirable to map not just on the subject of the account, but also on the attribute of the account. For example, an attribute may be a role indicating the account belongs to that of the manager.

Figure 3A:
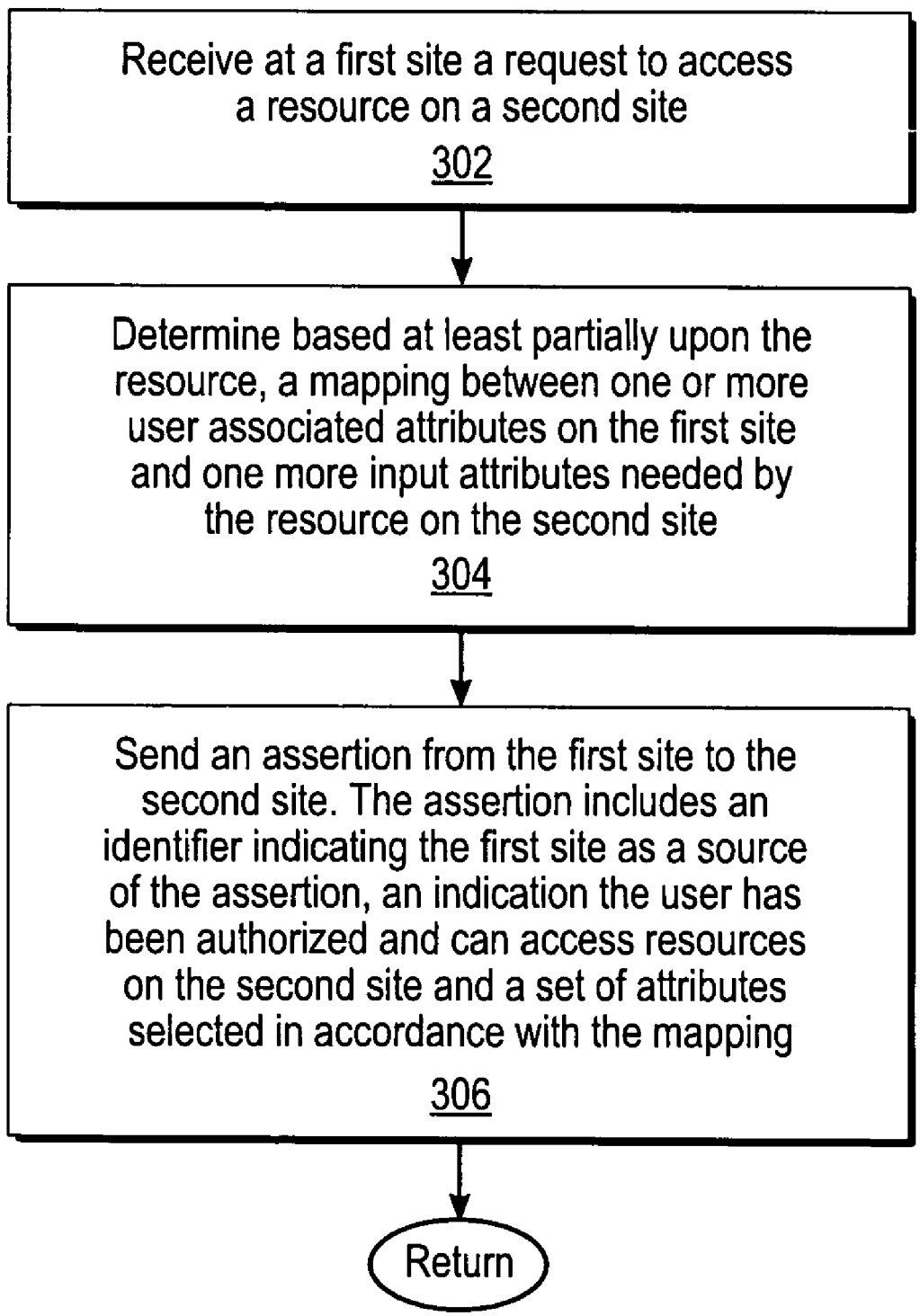
FIGS. 3A-3B are operational flow diagrams illustrating the operation of one embodiment of the present invention.

In accordance with one embodiment of the present invention, there is provided a mechanism for implementing the ability to determine different attribute sets for different resources on behalf of a user or user agent authenticated with a first site that is seeking to access the resources of a second site without re-authenticating at the second site. With this mechanism, it is possible for users or user agents authenticated with a first site to access one or more different resources on a second site in a computing environment without having to re-authenticate. An operational flow diagram, which provides a high level overview of one embodiment of the present invention, is shown in FIG. 3A.

In one embodiment, a request to access a resource on a second site is received at a first site (block 302). A user has already authenticated with the first site. The resource may be any application or service. A mapping between one or more user associated attributes on the first site and one or more input attributes needed by the resource on the second site is determined based at least partially upon the resource (block 304). An assertion is sent from the first site to the second site (block 306). The assertion comprises an identifier indicating the first site as a source of the assertion, an indication the user has been authorized and can access resources on the second site and a set of attributes selected in accordance with the mapping. The method can allow access to the second site and the resource on the second site without requiring the user to authenticate with the second site. As used herein, "site" is intended to be broadly construed to include any computational entity capable of hosting one or more resources. As used herein, "resource" is intended to be broadly construed to include any computational entity that provides a service. As used herein, "assertion" is intended to be broadly construed to include any statement or statements, at least a portion of which can be tested for its veracity.

In one embodiment, the indication that the user has been authorized is provided using Security Assertion Markup Language (SAML), which is an extension of eXtended Markup Language (XML) for providing single sign-on functionality. In one embodiment, users may be provided the ability to authenticate in one domain and use the resources in another domain without re-authenticating.

In one embodiment, the method also includes receiving a second request to access a second resource on the second site. The second resource is different from the resource. A second mapping between one or more user associated attributes on the first site and one or more input attributes needed by the second resource on the second site is determined based at least partially upon the second resource. The second mapping is different from the mapping determined from the request. A second assertion is sent from the first site to the second site. The second assertion differs from the assertion. Further, the second assertion uses different attributes and is based upon a different mapping than the assertion.

In one embodiment, determining a mapping between one or more user associated attributes on the first site and one or more input attributes needed by the resource on the second site based at least partially upon the resource includes selecting an attribute set from a plurality of attribute sets for mapping information from an application on the first site to the resource on the second site.

In one embodiment, the method also includes providing an attribute set for each application provided by each one of a set of one or more partner sites.

In one embodiment, the method also includes adding an artifact to the request. The artifact comprises the identity of the first site and a unique identifier corresponding to an assertion provided by the first site. The request is redirected from the first site to the second site. The assertion is sent from the first site to the second site responsive to receipt of a request from the second site made based upon the artifact.

In one embodiment, the resource may be an application, such as a travel agent application, a rental car application, an electronic commerce application, or a reservation application. In one embodiment, the resource may be a service, such as a backup storage service, a storage service, a user authorization service, or an encryption/decryption service.

Figure 3B:
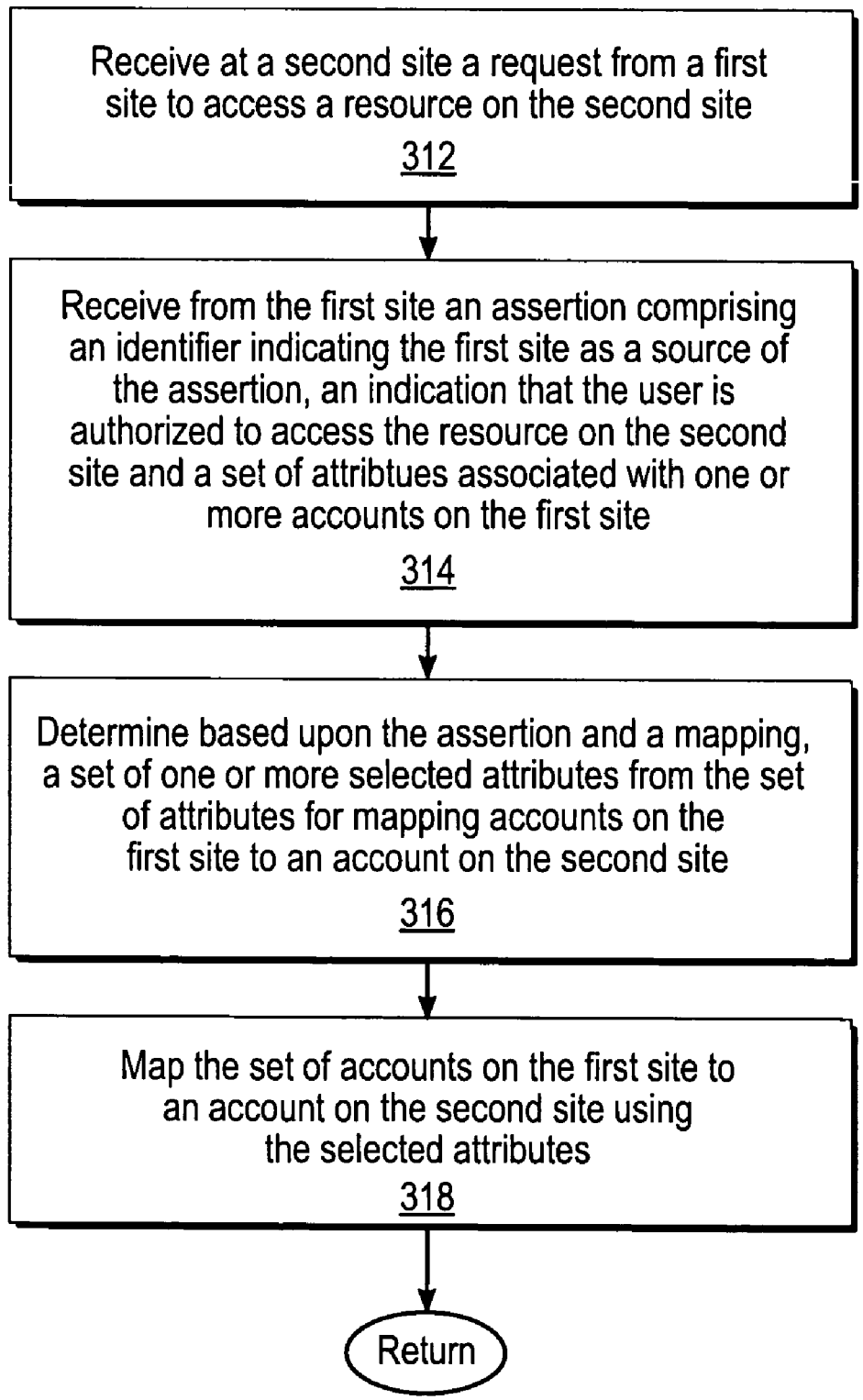

In another aspect, in one embodiment of the present invention, there is provided a mechanism for implementing the ability to map a set of accounts on a first site to accounts on the second site using a set of attributes selected from among attributes provided by an application on the first site. With this mechanism, it is possible for users or user agents authenticated with a first site to be directed to one or more different accounts on a second site based upon any of a wide variety of account information other than simply the account identifier without re-authenticating at the second site. An operational flow diagram, which provides a high level overview of this embodiment of the present invention, is shown in FIG. 3B.

In one embodiment, a request from a first site to access a resource on a second site is received at the second site (block 312). A user has already authenticated with the first site. The resource may be any application or service. An assertion is received from the first site responsive to a request by the second site (block 314). The assertion may include an identifier indicating the first site as a source of the assertion, an indication that the user is authorized to access the resource on the second site and a set of attributes associated with one or more accounts on the first site. A set of one or more selected attributes for mapping accounts on the first site to the resource on the second site are determined from the set of attributes based upon the assertion and a mapping (block 316). The attributes need not include an account identifier. One or more accounts on the first site are mapped to accounts on the second site using at least one of the selected attributes (block 318).

In one embodiment, the method also includes receiving a second request from the first site to access the resource on the second site. The second request is received from a second user that has already authenticated with the first site. The second user is different from the user. A second assertion is received from the first site. The second assertion comprises a second identifier indicating the first site as a source of the assertion, an indication that the second user is authorized to access the resource on the second site and a set of attributes associated with one or more accounts on the first site. A second set of one or more selected attributes from the set of attributes for mapping accounts on the first site to accounts on the second site is determined based upon the assertion and a mapping. The second set of one or more selected attributes does not include an account identifier. The second set of one or more selected attributes includes at least one attribute in common with the set of one or more selected attributes. A second account on the first site is mapped to the account on the second site using at least one of the selected attributes.

In one embodiment, the method also includes receiving an artifact added to the request. The artifact comprises the identity of the first site and a unique identifier corresponding to an assertion prepared by the first site. The second site requests the assertion based upon information in the artifact.

In other aspects, the invention encompasses in some embodiments, computer apparatus, computing systems and machine-readable media configured to carry out the foregoing methods.

From the above discussion, it is clear that this embodiment of the present invention enables users or user agents to navigate seamlessly between sites in a computing environment in order to access resources on different sites without having to re-authenticate when site boundaries are crossed. More specifically, a user that has authenticated with a first site would like to obtain access to the resource on the second site without having to re-authenticate in order to save time and effort. For example, a user that has authenticated with a travel agent's site may desire to access his frequent flyer account on another site to update his frequent flyer program information when making travel arrangements at the first site. Further, it may be desirable to map information about accounts on the first site to accounts related to resources or applications on the second site using a set of one or more attributes about the account. For example, an administrator at the second site may desire to map accounts of persons located on the west coast to one account and accounts of persons located on the east coast to a different account. This ability to share information among applications or other resources seamlessly across disparate sites makes it possible to attain improved efficiency from computing resources that are used to provide services to users or user agents in a computer system.

System Overview

Figure 1:
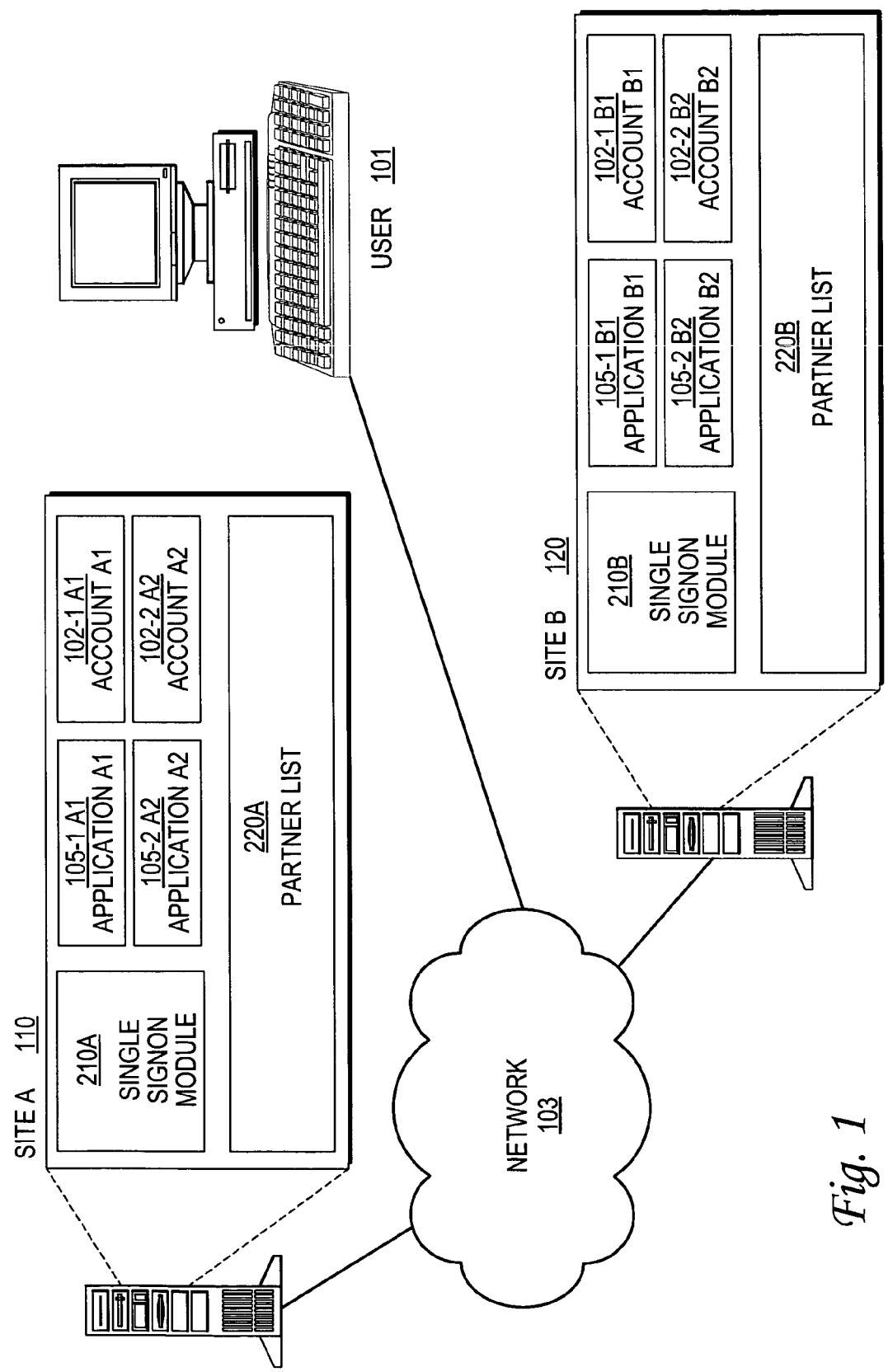
FIG. 1 is a functional block diagram of an example computing environment in which one embodiment of the present invention may be implemented.

FIG. 1 is a functional block diagram of an example computing environment in which navigation between sites in a computing environment in order to access resources without having to re-authenticate in one embodiment of the present invention may be implemented. While the invention is illustrated generally with reference to an example of sites connected using a network connection, the present invention does not require such an environment, and in some embodiments, techniques according to the invention may be implemented using sites co-located on a single workstation or connected using other connection mechanisms.

As shown in FIG. 1, first site A (also referred to as a "local site") 110 and second site B (also referred to as a "partner site") 120. In the example configuration depicted by FIG. 1, a first machine comprising site A 110 is connected to a network 103, which provides connectivity to a second machine comprising site B 120 and to a user machine 101. Network 103 may be any type of network, however in one embodiment, network 103 comprises a packet network. In one example configuration, site A 110 and site B 120 may be servers that provide information to users 101 using web sites, for example. In another example configuration, site B 120 may be a storage manager that manages or controls one or more persistent storage devices for applications on site A 110. Accordingly, in various example configurations, site A 110 and site B 120 may be a workstation, server or other computer.

In one embodiment, site A 110 and site B 120 are trusted partner sites. This means that site A 110 and site B 120 exchange information about one another in order to facilitate single sign-on access by users or user agents to applications and other resources residing on site A 110 and second site B 120. A client 101 authenticates with site 110, and provides a username, password or the like. Based upon the username, password and the like, the site 110 authenticates the client 101 and determines the client's 101 authorization to access particular resources. Trusted partner sites, such as site B 120, will permit client 101 to access particular resources on site B 120 without re-authentication. For example, user 101 visits a website (site A 110 for example) of a travel agency to schedule a trip. The travel agency will authenticate the user using a user identifier and password of personal identification number (PIN). The user will likely be required to enter their name, address and the like to book a flight. The user's address may be stored as a field (e.g., address) in a record corresponding to the user's reservation. The user may desire to access the resources of a second website (site B 120 for example), such as a car rental agency to reserve a rental car. Because site A 110 and site B 120 are trusted partner sites that have exchanged information about applications and user accounts, the user 101 is able to access resources of site B 120 without having to re-authenticate. Further, the user will not be required to enter name and address information at the second site B 120 in order to reserve the car.

In the embodiment illustrated by FIG. 1, site A 110 includes a single sign-on module 210A, which performs processing to enable an authenticated user, such as user 101, to access partner sites, such as site B 120 without having the re-authenticate. Site A 110 includes a partner list 220A, which includes information about partner sites, such as site B 120 that enables authenticated users of site A 110 to access resources on trusted partner sites. Site A 110 also may include one or more applications, such as application A1 105-1 A1 and application A2 105-2 A2, which are resident in site A 110 and provide services to users 101. The services provided by application A1 105-1 A1 or application A2 105-2 A2 vary by implementation. In one example embodiment, application A1 105-1 A1 and application A2 105-2 A2 may provide travel reservation services, for example. Other applications, such as on-line banking, merchandise sales and so forth may be provided by application A1 105-1 A1 and application A2 105-2 A2 in other implementations. In the embodiment illustrated by FIG. 1, users may have accounts, such as account A1 102-1 A1 and account A2 102-2 A2 that may be managed by application A1 105-1 A1 or application A2 105-2 A2. For example, a user 101 may have an account A1 102-1 A1 with a travel reservation application A1 105-1 A1.

As further illustrated by FIG. 1, site B 120 also includes a single sign-on module 210B, which performs processing to enable a user that has authenticated with site A 110 to access site B 120 without having the re-authenticate. Site B 120 includes a partner list 220B, which includes information about partner sites, such as site A 110 that enables authenticated users of trusted partner sites, such as site A 110, to access applications and other resources on site B 120. Site B 120 also includes one or more resources, such as application B1 105-1 B1 and application B2 105-2 B2, which are resident in site B 120 and provide services to users 101. The services provided by application B1 105-1 B1 or application B2 105-2 B2 vary by implementation. One or more accounts, such as account B1 102-1 B1 and account B2 102-2 B2 that may be managed by application B1 105-1 B1 or application B2 105-2 B2.

Figure 2:
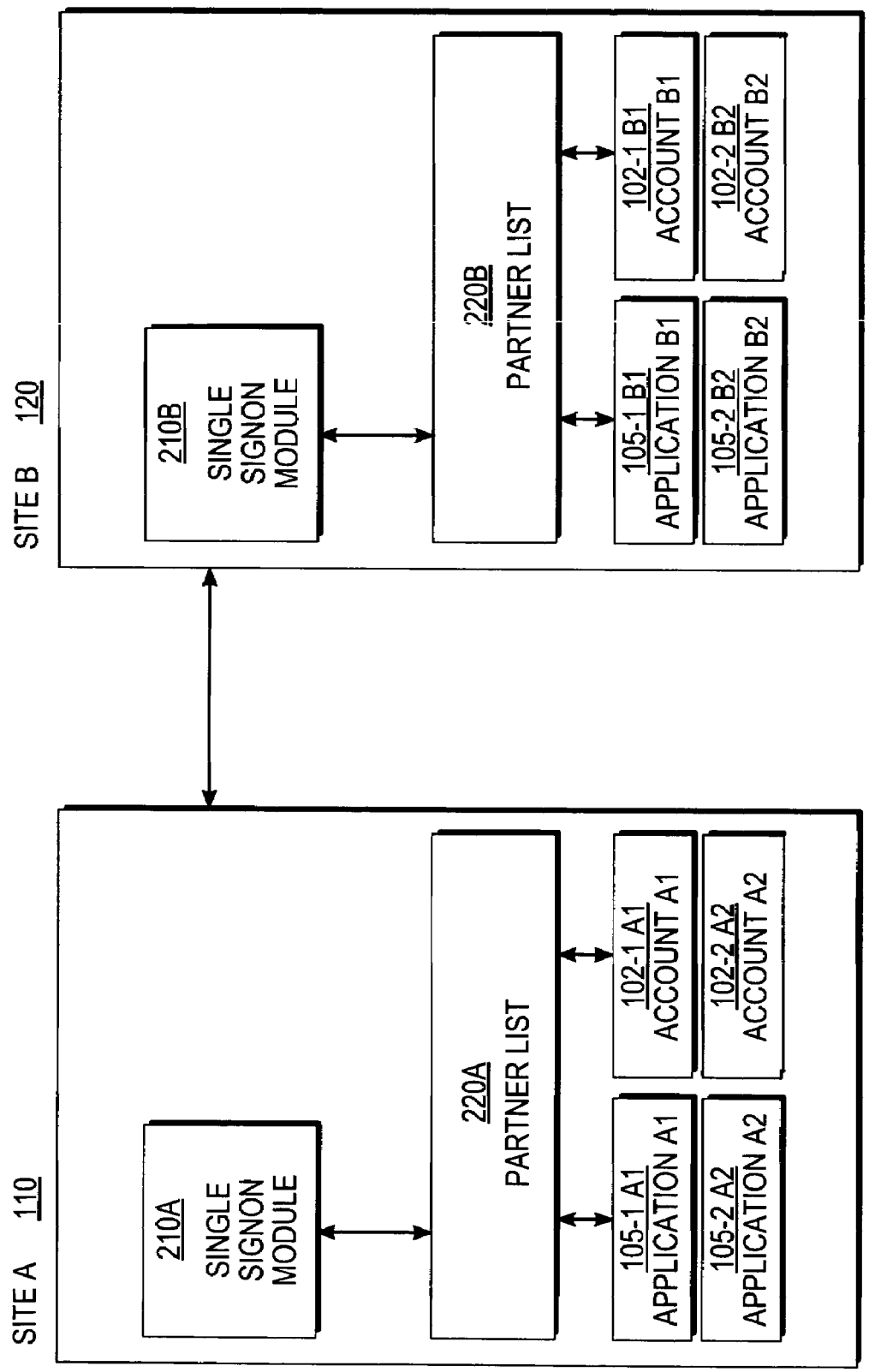
FIG. 2 is a functional block diagram of an example single sign-on resource access in the computing environment of FIG. 1 in one embodiment of the present invention.

FIG. 2 is a functional block diagram of an example single sign-on resource access in the computing environment of FIG. 1 in one embodiment of the present invention. As depicted by FIG. 2, each of sites A and B 110, 120 comprises single sign-on modules 210A, 210B and a partner list 220A, 220B, respectively. The single sign-on modules 210A, 210B access information about partner sites in partner lists 220A, 220B respectively to manage single sign-on functions between the sites A 110 and B 120. One or more applications, such as application A1 105-1 A1 and application A2 105-2 A2 may reside on site A 110. Each application may have one or more accounts, such as account A1 102-1 A1 and account A2 102-2 A2 associated with the application. Similarly, one or more applications B1 105-1 B1 and B2 105-2 B2 and one or more associated accounts B1 102-1 B1 and B2 102-2 B2 may reside on site B 120. A user 101 authenticated with site A 110, for example, may interact with application A1 105-1 A1 using an account A1 102-1 A1. The user 101 may desire to access a resource on site B 120, such as application B2 105-2 B2, for example. Single sign-on module 210A determines from partner list 220A that a trusted partner relationship exists with site B 120, and prepares an assertion comprising information for site B 120 to enable user 101 to access the application B2 105-2 B2 without requiring the user 101 to re-authenticate. User 101 may maintain an account B2 102-2 B2 on site B 120, as well. Accordingly, single sign-on module 210A can include account attributes in the assertion to enable information about user 101 to be transferred to site B 120 without requiring user 101 to re-enter the information.

In one embodiment, single sign-on operations are provided using a system of SAML requests and assertions between site A 110 and site B 120. For example, when site B 120 receives a SAML request or assertion containing an entity identifier, the single sign-on module 210B looks up the entity identifier from the request in the trusted partner list 220B. A record containing a matching entity identifier provides the applicable account mapping, attribute mapping, site attribute list, and/or action mapping. The one or more mappings are then utilized to process or generate the SAML request or assertion.

In one embodiment, a user 101 that has authenticated with site A 110 to access application A1 105-1 A1 may request to access one of the applications on site B 120, either application B1 105-1 B1 or application B2 105-2 B2. The single sign-on module 210A will determine from information about applications on site B 120 from information previously exchanged between site A 110 and site B 120 and stored in the partner list 220A. The single sign-on module 210A will determine the proper attributes for the requested application on site B 120, application B1 105-1 B1 for example. The single sign-on module 210A will prepare an SAML assertion comprising, for example, an entity identifier (e.g., site A), a certificate, a network address (e.g., internet protocol address) of site A 110 and an attribute set appropriate for mapping information from application A1 105-1 A1 on site A 110 to application B1 105-1 B1 on site B 120. The assertion will be sent to the site B 120 in order to enable user 101 to access application B1 105-1 B1 on site B 120. If user 101 (or a second user authenticated with site A 110) makes a second request to access application B2 105-2 B2, the single sign-on module 210A builds a second assertion based upon a second set of attributes for mapping information from application A1 105-1 A1 on site A 110 to application B2 105-2 B2 on site B 120. The second assertion will be sent to the site B 120 in order to enable user 101 to access application B2 105-2 B2 on site B 120. The second assertion and second set of attributes are different from the assertion and attributes built to access application B1 105-1 B1.

In one embodiment, site B 120 may receive a request from a user 101 that has authenticated with site A 110 to access application A1 105-1 A1 using a particular account, such as account A1 102-1 A1, for example. Site B 120 may map the user's request to an account on site B 120, such as account B1 102-1 B1 or account B2 102-2 B2, for example. The single sign-on module 210B will determine from information included in an SAML assertion from site A 110 an account to map the account of user 101 to at site B 120. For example, the SAML assertion may include an identifier indicating the site A 110 as a source of the assertion, an indication that the user 101 is authorized to access the resource on site B 120 and a set of attributes associated with account A1 102-1 A1 on site A 110. The single sign-on module 210B will search information about accounts on site A 110 previously exchanged between site A 110 and site B 120 and stored in the partner list 220B. The single sign-on module 210B will determine the proper mapping of the account A1 102-1 A1 on site A 110 for an account on site B 120, either account B1 102-1 B1 or account B2 102-2 B2 using one or more attributes in the assertion based upon an account mapping retrieved from the partner list 220B. If site B 120 receives a second request, from a second user authenticated with site A 110 to access application A1 105-1 A1 using a different account, such as account A2 102-2 A2, site B 120 may map the user's request to an account on site B 120, such as account B1 102-1 B1 or account B2 102-2

B2. The single sign-on module 210B will determine the proper mapping of the account A2 102-2 A2 on site A 110 for an account on site B 120, either account B1 102-1 B1 or account B2 102-2 B2 using one or more attributes in the assertion based upon an account mapping retrieved from the partner list 220B. The single sign-on module 210B is not restricted to mapping accounts simply by account identifier. In fact, the single sign-on module 210B may use any of a selected set of attributes to map the accounts.

In one embodiment, sites A 110 and B 120 exchange information about one another in order to establish a trusted partner site relationship to facilitate single sign-on capability. The single sign-on modules 210A of the site A 110 receives information about site B 120 and records the information into the partner list 220A. In one embodiment, partner list 220A may store one or more of an entity identifier of a site B 120, certificates or other security credentials, network addresses, mappings between one or more accounts of the site B 120 and one or more accounts of the site A 110, mappings of security authorizations of site B 120 to those of site A 110 and mappings between one or more sets of attributes of site B 120 and one or more sets of attributes of site A 110. Other information may also be exchanged between sites A 110 and B 120 in order to establish a trusted partner site relationship to facilitate single sign-on capability.

In one embodiment, a number of mechanisms may be used to enable first site A 110 and second site B 120 to exchange information. In one embodiment, information about applications and other resources deployed on first site A 110 and second site B 120 is exchanged and stored in each site's respective trusted partner lists 220A, 220B in order to permit site A 110 and site B 120 to share information. For example, an account mapping, an attribute mapping, a site attribute list, action mapping may be used in one embodiment to provide exchange of information between applications and resources on first site A 110 and second site B 120.

An account mapping defines how a subject, such as a user account on the first site A 110 and a subject, such as a second user account on the second site B 120 are mapped to each other (e.g., "jane_doe" on site A is mapped to "jdoe" on site B). The attribute mapping defines how an attribute and/or an attribute namespace between the first site A 110 and second site B 120 are mapped (e.g., street="101 First Ave.", city="Anytown", state="California" and zip="12121" on site A is mapped to address="101 First Ave., Anytown, California 12121" on site B). The site attribute list defines what attributes need to be exchanged between the first site A 110 and second site B 120 (e.g., name, address, telephone number, social security number). The action mapping defines what authorization decision information is exchanged between the first site A 110 and second site B 120 (e.g., permission to access particular records associated with the client on an application residing on site A 110 (e.g., financial) may be mapped to permission to access particular records associated with the client on an application residing on site B 120 (e.g., payroll)).

Figure 4:
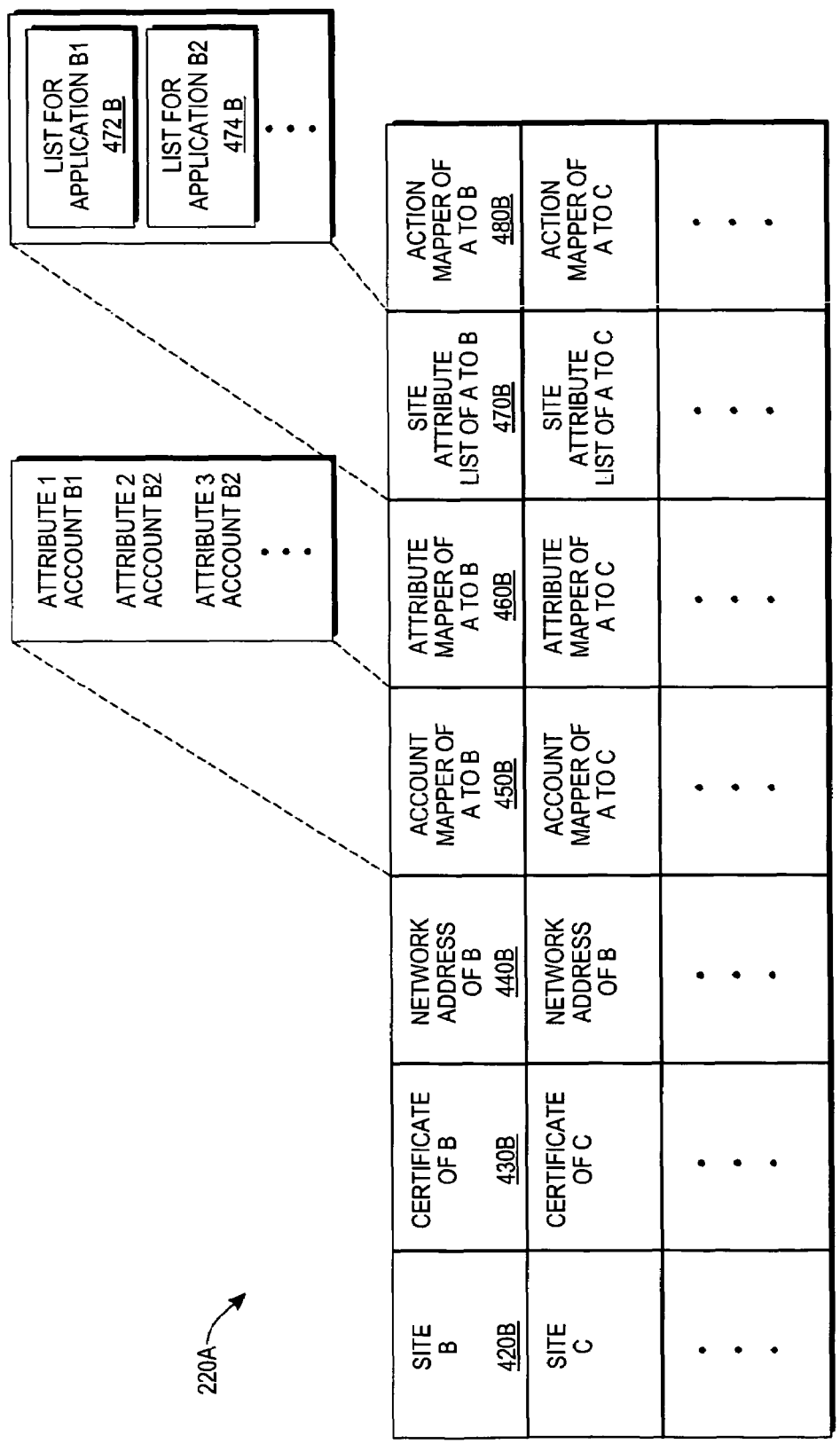
FIG. 4 is a functional block diagram of an example partner list for establishing single sign-on functionality between sites in the computing environment of FIG. 1 in one embodiment of the present invention.

Referring now to FIG. 4, an example trusted partner list, in accordance with one embodiment of the present invention, is shown. As depicted in FIG. 4, the trusted partner list 220A of site A 110 comprises a plurality of records. In one implementation, each record 420B comprises an identifier of a second site, and an account mapping 450B between the first site and the second site. For example, the partner list 220A for site A 110 may comprise identifiers for sites B 120 and C (not shown), and account mappings of A to B and A to C. Each record may further comprise a certificate 430B and a network address 440B corresponding to the second site, an attribute mapping 460B, a site attribute list 470B, and action mapping 480B, between the first site and the second site. In the example embodiment illustrated by FIG. 4, the partner list for server A may further comprise certificates of B and C, network address (e.g., internet protocol addresses) of B and C, attribute mappings of A to B and A to C, site attribute lists of A to B and A to C, and action mappings of A to B and A to C.

In one embodiment, records in partner list 220 may include enhancements to support features of mapping plural applications on a single site and attribute based account mapping. Specifically, as depicted by FIG. 4, the partner list 220A includes a site attribute list 470B for site B's record 420B having a plurality of attribute sets, including a first list 472B for application B1 105-1 B1 and a second list 474B for application B2 105-2 B2. In one embodiment, single sign-on module 210A on site A 110 uses site attribute list 470B to determine different attribute sets for use with different resources on target site B 120 for a user 101 authenticated with site A 110 who is seeking to access one or more resources of site B 120 without re-authenticating.

Further with reference to FIG. 4, the partner list 220A includes an account mapper 450B for site B 120 having a plurality of attribute to account relationships. In one embodiment, single sign-on module 210B on site B 120 uses account mapper 450B to map a set of accounts on site A 110 to accounts on site B 120 using a set of attributes selected from among attributes provided by an application on the site A 110.

Figure 5A:
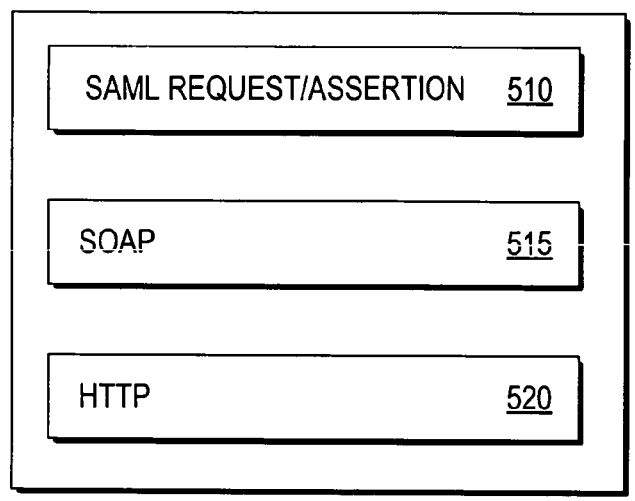
FIGS. 5A-5B are functional block diagrams of message headers implementing single sign-on functionality in one embodiment of the present invention.

In one embodiment, single sign-on functionality is provided using a system of SAML requests and assertions between site A 110 and site B 120. Referring now to FIG. 5A, an example of a SAML request/assertion according to one embodiment is shown. As depicted in FIG. 5A, SAML requests and assertions 510 are transmitted within a Simple Object Access Protocol (SOAP) envelope 515 via HTTP 520.

Figure 5B:
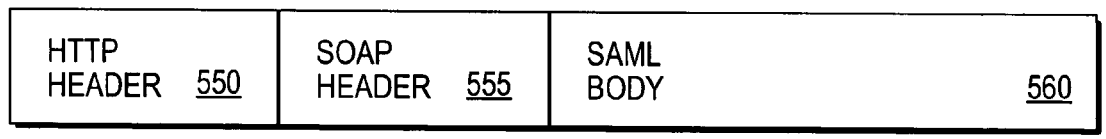

Referring now to FIG. 5B, an example of a SAML data packet according to one embodiment is shown. As depicted in FIG. 5B, the data packet comprises an HTTP header 550, a SOAP header 555 and a SAML payload 560. A request or assertion is encoded into the SAML payload 560. A SOAP header 555 is then generated and attached to the SAML payload 560. An HTTP header 550 is then generated and attached to the SOAP header 555 and SAML payload 560. The SAML payload containing a request or assertion may comprise an issuer identifier, an assertion identifier, an optional subject, an optional advice, a condition, an audience restriction, a target restriction, an application specific condition and the like.

Upon receipt, the HTTP header 550 is processed to provide routing and flow control. The SOAP header 555 is then processed to provide information concerning the content of the payload and how to process it. The SAML payload 560 may then be processed to provide security information.

Hardware Overview

Figure 6:
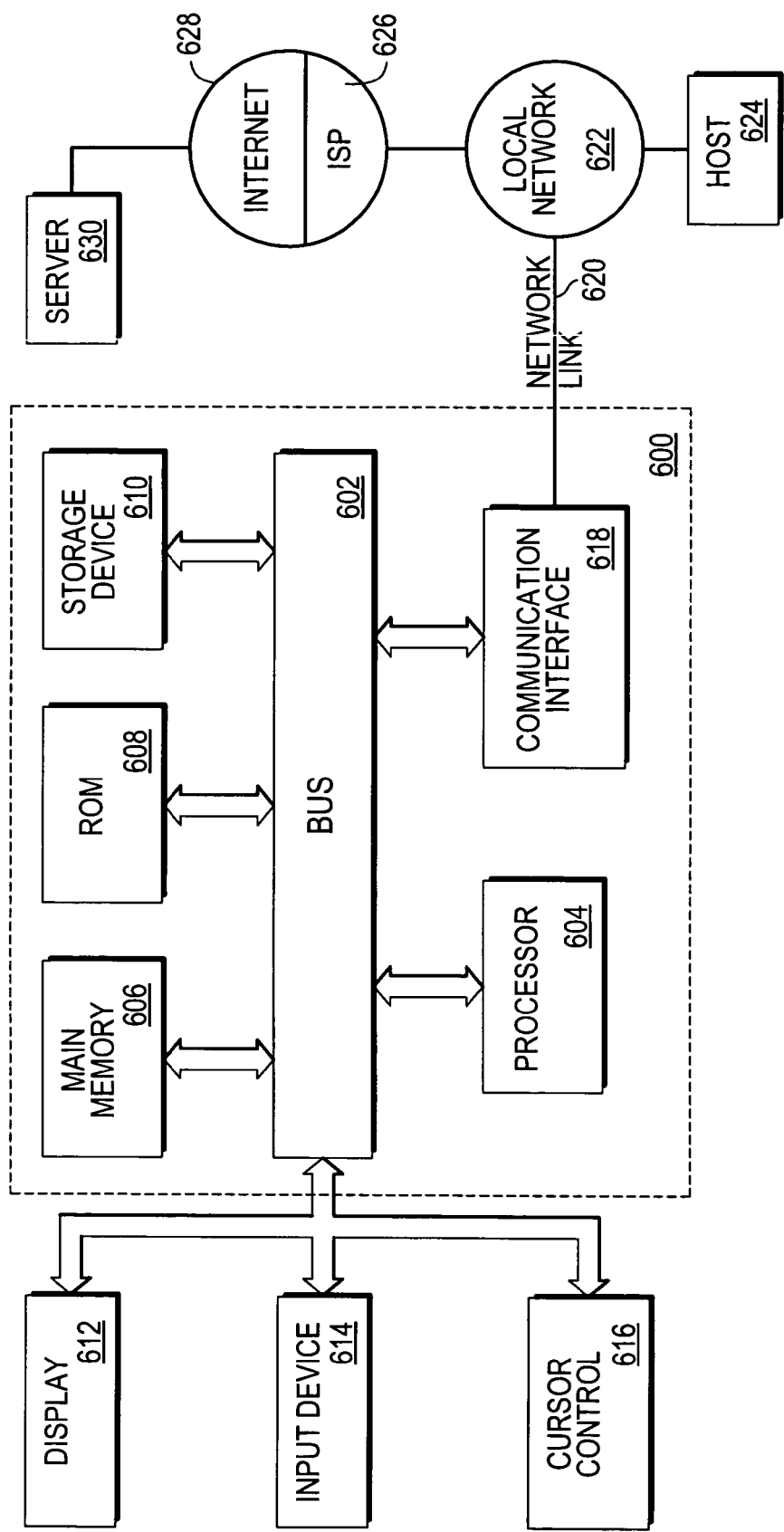
FIG. 6 is a hardware block diagram of an example computer system, which may be used to embody one or more components of an embodiment of the present invention.

FIG. 6 is a block diagram that illustrates a computer system 600 upon which an embodiment of the invention may be implemented. Computer system 600 includes a bus 602 for facilitating information exchange, and one or more processors 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions by processor 604. Computer system 600 may further include a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

In computer system 600, bus 602 may be any mechanism and/or medium that enables information, signals, data, etc., to be exchanged between the various components. For example, bus 602 may be a set of conductors that carries electrical signals. Bus 602 may also be a wireless medium (e.g. air) that carries wireless signals between one or more of the components. Bus 602 may also be a medium (e.g. air) that enables signals to be capacitively exchanged between one or more of the components. Bus 602 may further be a network connection that connects one or more of the components. Overall, any mechanism and/or medium that enables information, signals, data, etc., to be exchanged between the various components may be used as bus 602.

Bus 602 may also be a combination of these mechanisms/media. For example, processor 604 may communicate with storage device 610 wirelessly. In such a case, the bus 602, from the standpoint of processor 604 and storage device 610, would be a wireless medium, such as air. Further, processor 604 may communicate with ROM 608 capacitively. In this instance, the bus 602 would be the medium (such as air) that enables this capacitive communication to take place. Further, processor 604 may communicate with main memory 606 via a network connection. In this case, the bus 602 would be the network connection. Further, processor 604 may communicate with display 612 via a set of conductors. In this instance, the bus 602 would be the set of conductors. Thus, depending upon how the various components communicate with each other, bus 602 may take on different forms. Bus 602, as shown in FIG. 6, functionally represents all of the mechanisms and/or media that enable information, signals, data, etc., to be exchanged between the various components.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A method, comprising:
   receiving by a second server at a second site a first request from a first server at a first site to access a resource on the second site, wherein a first user has authenticated with the first site;
   receiving from the first site a first assertion comprising an identifier indicating the first site as a source of the first assertion, an indication that the first user is authorized to access the resource on the second site and a first set of attributes associated with a first account on the first site;
   determining, based upon the first assertion and a mapping, a subset of the first set of attributes to be used for mapping accounts on the first site to accounts on the second site, wherein the subset of the first set of attributes does not include an account identifier for the first account on the first site;
   mapping the first account on the first site to a particular account on the second site based upon the subset of the first set of attributes;
   receiving at the second site a second request from the first site to access the resource on the second site, wherein a second user has authenticated with the first site, the second user differing from the first user;
   receiving from the first site a second assertion comprising an identifier indicating the first site as a source of the second assertion, an indication that the second user is authorized to access the resource on the second site, and a second set of attributes associated with a second account on the first site;
   determining, based upon the second assertion and a mapping, a subset of the second set of attributes to be used for mapping accounts on the first site to accounts on the second site, wherein the subset of the second set of attributes does not include an account identifier for the second account on the first site, and wherein the subset of the second set of attributes includes at least one attribute in common with the subset of the first set of attributes; and
   mapping the second account on the first site to the same particular account on the second site based upon the subset of the second set of attributes, thereby mapping a plurality of accounts on the first site to the same particular account on the second site.

2. The method of claim 1, wherein the resource comprises at least one of:
   an application and a service.

3. The method of claim 2, wherein:
   application includes at least one of: a travel agent application, a rental car application, an electronic commerce application, and a reservation application; and
   service includes at least one of: a backup storage service, a storage service, a user authorization service, and an encryption/decryption service.

4. The method of claim 1, further comprising:
   receiving an artifact added to the first request, which artifact comprises an identity of the first site and a unique identifier corresponding to a specific assertion prepared by the first site; and
   requesting the specific assertion based upon the artifact.

5. A machine readable storage medium, carrying one or more sequences of instructions for mapping accounts within a single sign-on computing environment, which instructions, when executed by one or more processors, cause the one or more processors to carry out the steps of:
   receiving at a second site a first request from a first site to access a resource on the second site, wherein a first user has authenticated with the first site;
   receiving from the first site a first assertion comprising an identifier indicating the first site as a source of the first assertion, an indication that the first user is authorized to access the resource on the second site and a first set of attributes associated with a first account on the first site;
   determining, based upon the first assertion and a mapping, a subset of the first set of attributes to be used for mapping accounts on the first site to accounts on the second site, wherein the subset of the first set of attributes does not include an account identifier for the first account on the first site;
   mapping the first account on the first site to a particular account on the second site based upon the subset of the first set of attributes;
   receiving at the second site a second request from the first site to access the resource on the second site, wherein a second user has authenticated with the first site, the second user differing from the first user;
   receiving from the first site a second assertion comprising an identifier indicating the first site as a source of the second assertion, an indication that the second user is authorized to access the resource on the second site, and a second set of attributes associated with a second account on the first site;
   determining, based upon the second assertion and a mapping, a subset of the second set of attributes to be used for mapping accounts on the first site to accounts on the second site, wherein the subset of the second set of attributes does not include an account identifier for the second account on the first site, and wherein the subset of the second set of attributes includes at least one attribute in common with the subset of the first set of attributes; and
   mapping the second account on the first site to the same particular account on the second site based upon the subset of the second set of attributes, thereby mapping a plurality of accounts on the first site to the same particular account on the second site.

6. The machine readable storage medium of claim 5, wherein the resource comprises at least one of:
   an application and a service.

7. The machine readable storage medium of claim 6, wherein:
   application includes at least one of: a travel agent application, a rental car application, an electronic commerce application, and a reservation application; and
   service includes at least one of: a backup storage service, a storage service, a user authorization service, and an encryption/decryption service.

8. The machine readable storage medium of claim 5, further comprising instructions for causing one or more processors to carry out the steps of:

receiving an artifact added to the first request, which artifact comprises an identity of the first site and a unique identifier corresponding to a specific assertion prepared by the first site; and requesting the specific assertion based upon the artifact.

9. An apparatus, comprising:

one or more processors configured to implement:

a mechanism for receiving by a second server at a second site a first request from a first server at a first site to access a resource on the second site, wherein a first user has authenticated with the first site;

a mechanism for receiving from the first site a first assertion comprising an identifier indicating the first site as a source of the first assertion, an indication that the first user is authorized to access the resource on the second site and a first set of attributes associated with a first account on the first site;

a mechanism for determining, based upon the first assertion and a mapping, a subset of the first set of attributes to be used for mapping accounts on the first site to accounts on the second site, wherein the subset of the first set of attributes does not include an account identifier for the first account on the first site;

a mechanism for mapping the first account on the first site to a particular account on the second site based upon the subset of the first set of attributes;

a mechanism for receiving at the second site a second request from the first site to access the resource on the second site, wherein a second user has authenticated with the first site, the second user differing from the first user;

a mechanism for receiving from the first site a second assertion comprising an identifier indicating the first site as a source of the second assertion, an indication that the second user is authorized to access the resource on the second site, and a second set of attributes associated with a second account on the first site;

a mechanism for determining, based upon the second assertion and a mapping, a subset of the second set of attributes to be used for mapping accounts on the first site to accounts on the second site, wherein the subset of the second set of attributes does not include an account identifier for the second account on the first site, and wherein the subset of the second set of attributes includes at least one attribute in common with the subset of the first set of attributes; and a mechanism for mapping the second account on the first site to the same particular account on the second site based upon the subset of the second set of attributes, thereby mapping a plurality of accounts on the first site to the same particular account on the second site.

* * * * *